United States Patent
Bieber et al.

[11] Patent Number: 5,864,768
[45] Date of Patent: Jan. 26, 1999

[54] VEHICLE SUSPENSION CONTROL SYSTEM

[75] Inventors: Martin Bieber, Redford; Sam Mike Mackool, Berkley; Douglas Scott Rhode, Farmington Hills, all of Mich.

[73] Assignee: Ford Global Technologies, Inc., Dearborn, Mich.

[21] Appl. No.: 709,704

[22] Filed: Sep. 9, 1996

[51] Int. Cl.⁶ .................................................. B60G 17/015
[52] U.S. Cl. ..................... 701/38; 280/5.506; 280/5.507; 280/5.513
[58] Field of Search ................................. 701/37, 38, 39; 280/707, 840, 5.506, 5.507, 5.513

[56] References Cited

U.S. PATENT DOCUMENTS

| | | | |
|---|---|---|---|
| 5,062,658 | 11/1991 | Majeed | 701/38 |
| 5,071,157 | 12/1991 | Majeed | 701/38 |
| 5,119,297 | 6/1992 | Buma et al. | 701/38 |
| 5,322,318 | 6/1994 | Kimura et al. | 280/689 |
| 5,322,320 | 6/1994 | Sahashi et al. | 280/707 |
| 5,377,107 | 12/1994 | Shimizu et al. | 280/707 |
| 5,438,514 | 8/1995 | Kakizaki et al. | 701/39 |
| 5,442,554 | 8/1995 | Ohtagaki | 280/707 |
| 5,475,593 | 12/1995 | Townend | 701/38 |
| 5,488,562 | 1/1996 | Otterbein et al. | 701/38 |
| 5,510,986 | 4/1996 | Williams | 701/38 |
| 5,563,789 | 10/1996 | Otterbein et al. | 701/38 |

*Primary Examiner*—Gary Chin
*Attorney, Agent, or Firm*—Gregory P. Brown; Roger L. May

[57] ABSTRACT

A method and apparatus for controlling continuously variable dampers in a vehicle suspension system is provided. A microcontroller receives sensor signals from the vehicle and generates heave, pitch and roll acceleration signals, heave, pitch and roll actual velocity signals, and heave, pitch and roll velocity level signals based on the received sensor signals. Heave, pitch and roll control signals are then calculated based on the acceleration, actual velocity, and velocity level signals, and the continuously variable dampers are adjusted in accordance with the calculated heave, pitch and roll control signals. A deadband schedule function is provided for adjusting the control signals in accordance with the significance of the particular ride event.

10 Claims, 2 Drawing Sheets

VEHICLE SUSPENSION CONTROL SYSTEM

TECHNICAL FIELD

The present invention relates to a method and apparatus for controlling damping in a vehicle shock absorber and, more particularly, to a method and apparatus for controlling continuously variable dampers in a vehicle suspension system.

BACKGROUND OF THE INVENTION

Vehicle shock absorbers (also known as dampers) have undergone various design changes in recent years. Originally, shock absorbers were not adjustable. Then, multi-stage shock absorbers were developed which had two or perhaps three settings: soft, firm, and in some instances, an intermediate setting. Adaptive ride control systems based on this type of shock absorber must make many performance compromises due to the quantized damping levels. Most recently, "continuously variable" shock absorbers have been developed, which have an infinite, or at least large, number of settings between soft and firm. In the art, the term "continuously variable" includes dampers which have 16 or more settings. In addition, some continuously variable shock absorbers are soft when the control signal has some value, and become firm for rebound strokes only when the control signal is increased from that value, and become firm for bump strokes only when it is decreased. These are referred to as "skyhook" dampers, because they simplify the implementation of a control system based on "skyhook" theory. This theory states that damping force should be applied such that it opposes the velocity of the sprung mass, independent of the relative velocity between the sprung and unsprung masses.

Various "skyhook" theory based damping force control systems for adjustable automotive shock absorbers have been developed. Some of these systems have poor "balance", which means that the amplitude and phase relationship between bounce and pitch motions is objectionable. Some of these systems result in increased ride harshness due to "over-controlling" during smaller ride events. Some of these systems are perceived as "jerky" or "grabby" due to the control algorithms used to dynamically adjust the damping. Therefore, it is desirable to provide a method and apparatus for controlling continuously variable dampers in a manner which provides a high level of ride quality, with good balance, reduced harshness, and without any jerkiness.

SUMMARY OF THE INVENTION

The present invention overcomes the above-referenced shortcomings of prior art vehicle suspension systems by providing a method and apparatus for controlling continuously variable dampers which calculates heave, pitch, and roll control signals based on acceleration, actual velocity, and velocity level signals derived from vehicle body vertical acceleration signals. The continuously variable dampers are adjusted in accordance with the calculated control signals for improved ride quality. Additionally, a deadband schedule function is provided for adjusting the level of damper control signals in a manner which is indicative of the significance of the particular ride event.

More specifically, the present invention provides a method for controlling continuously variable dampers, comprising: 1) receiving sensor signals from the vehicle; 2) generating heave, pitch, and roll acceleration signals; heave, pitch, and roll actual velocity signals; and heave, pitch, and roll velocity level signals based on the received sensor signals; 3) calculating a heave control signal, a pitch control signal, and a roll control signal based on the acceleration, actual velocity and velocity level signals; and 4) adjusting the continuously variable dampers in accordance with the calculated heave, pitch and roll control signals. The present invention also provides a vehicle suspension system including a controller operative to implement the above method.

Accordingly, an object of the present invention is to provide an improved method and apparatus for controlling continuously variable dampers in a vehicle suspension system in a manner which provides a high level of ride quality, with improved balance, reduced harshness, and without any jerkiness.

DETAILED DESCRIPTION OF THE PREFERRED EMBODIMENT

The present invention provides a method and apparatus for generating heave, pitch, and roll control signals based on heave, pitch, and roll body accelerations, and provides a gain scheduling technique used to modulate these control signals. The method used to generate heave, pitch, and roll control signals allows the control system to provide a high level of ride quality, with good balance, reduced harshness, and without any jerkiness. The gain scheduling technique used allows an improvement in ride on flat roads with joints, tar strips, pot holes, etc. by adjusting damper hydraulic controls based upon the significance of the ride event. This scheduling technique not only improves vehicle ride on flat roads, but also ensures timely and smooth application of damper control whenever larger ride events are encountered.

Figure 1:
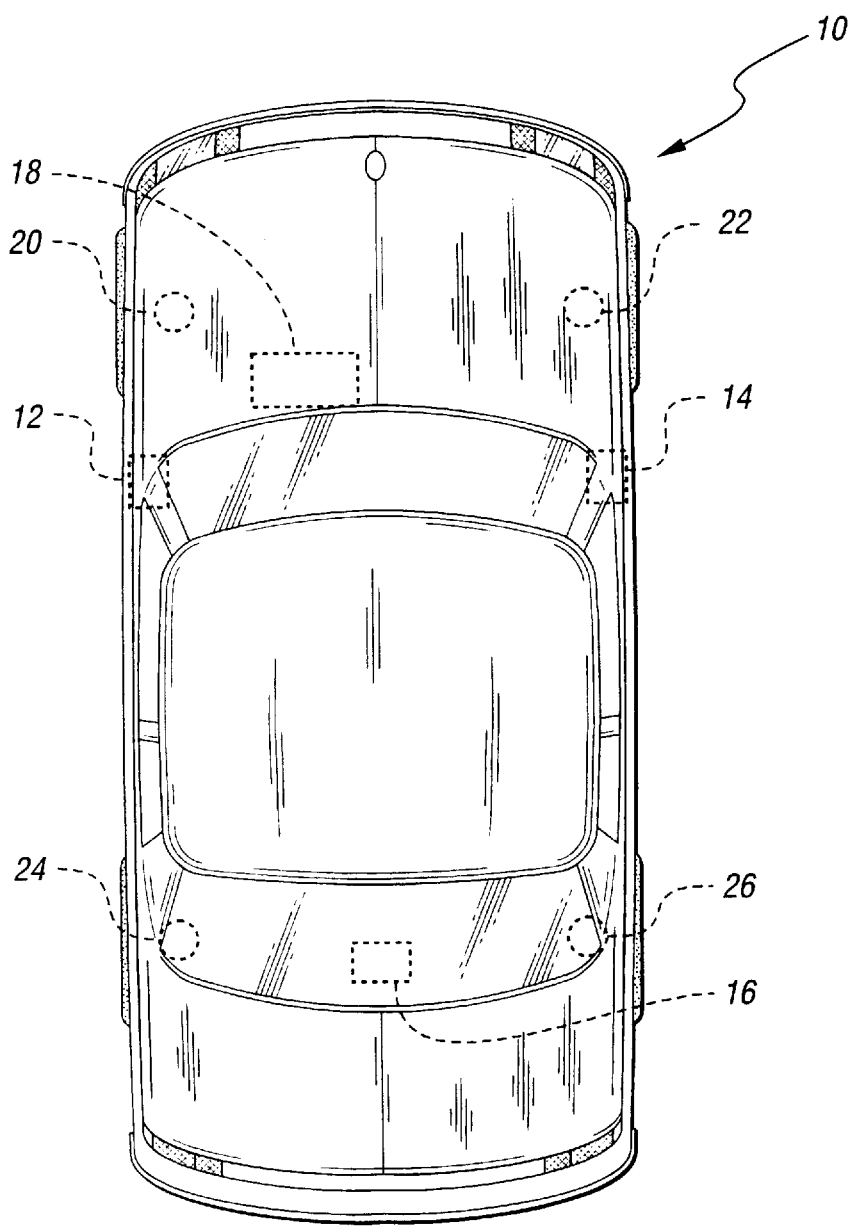
FIG. 1 shows a plan view of a vehicle including a vehicle suspension control system in accordance with the present invention.
Figure 2:
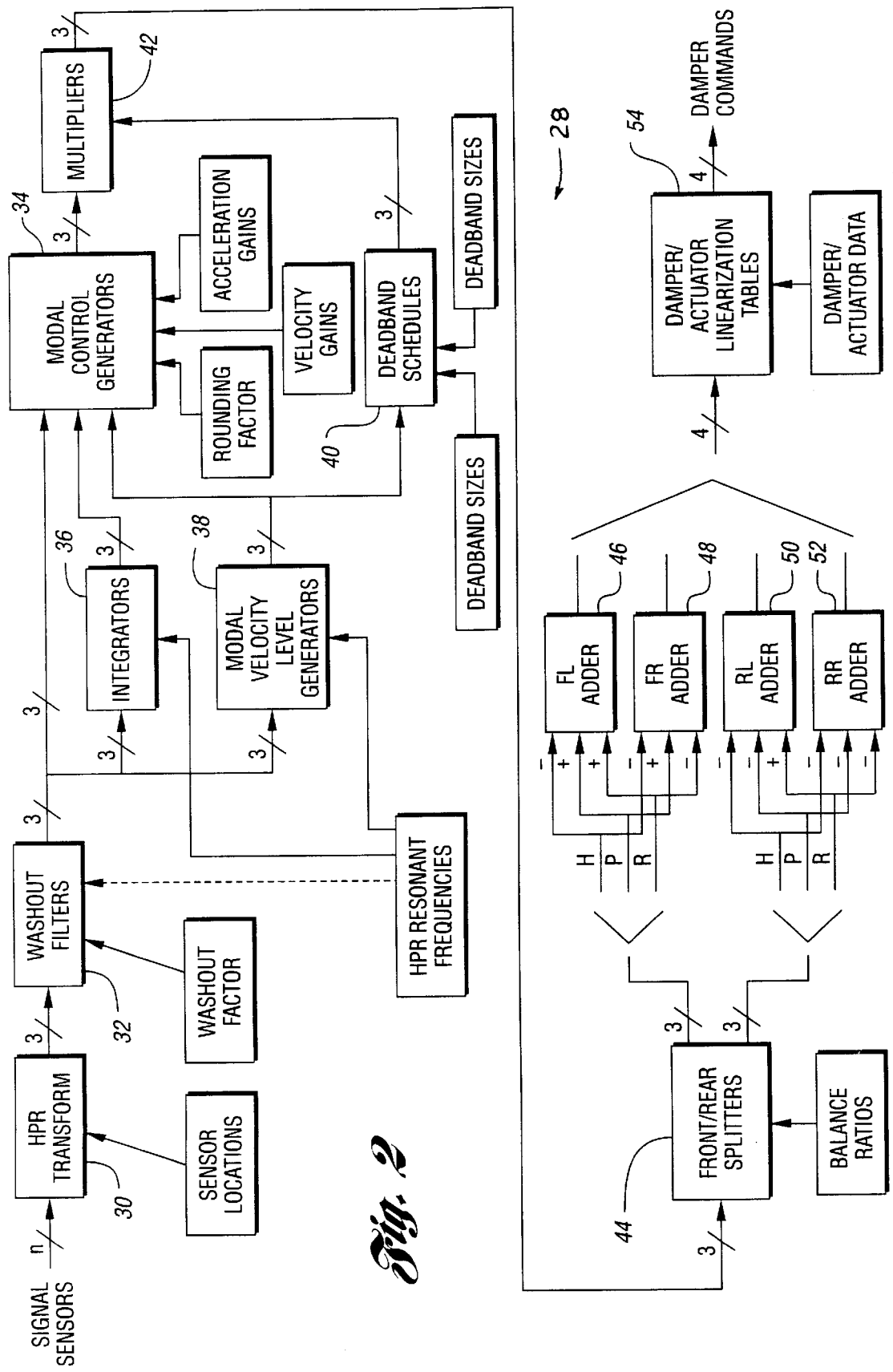
FIG. 2 shows a schematic block diagram of a control algorithm in accordance with the present invention.

The vehicle suspension system illustrated in FIG. 1 communicates with the control algorithm illustrated in FIG. 2 for improving the ride quality of the vehicle, including body control and ride plushness.

FIG. 1 illustrates a vehicle 10 incorporating three body-mounted vertical accelerometers 12,14,16 which provide inputs to the vehicle controller 18. The vehicle controller 18 outputs control signals to the vehicle suspension, which includes continuously variable dampers 20,22,24,26. Alternatively, the dampers 20,22,24,26 could be skyhook continuously variable dampers. The input signals from the sensors 12,14,16 allow the calculation of body accelerations in heave, pitch, and roll for control purposes.

Turning to FIG. 2, the sensor signals from the accelerometers 12,14,16 are input into the control algorithm 28 illustrated. The various steps of the control algorithm 28 are performed by the microcontroller 18 (FIG. 1). The HPR (heave, pitch, roll) transform block 30 performs a matrix multiplication taking n vertical accelerations as the input vector and yielding heave, pitch, and roll accelerations as the output vector. (Heave is vertical acceleration at the center of gravity of the body, positive being downward; pitch is angular acceleration, positive being front of the body upward; and roll is angular acceleration, positive being left side of the body upward.) The relationships between the sensor 12,14,16 locations with the center of gravity are input to the HPR transform 30 as calibratable constants. At the washout filter 32, a separate high pass filter is applied to each of the modal (heave, pitch, and roll) accelerations to remove low frequency components, including DC components, from each signal. The washout filter 32 receives a washout factor as a tuning parameter and HPR resonant frequencies as calibratable constants.

The three signals are then each directed to three locations: the modal control generator 34, the integrator 36, and the modal velocity level generator 38. At the integrator 36, each modal acceleration is integrated to yield an actual modal velocity. At the modal velocity level generator 38, velocity levels are calculated for the heave, pitch and roll signals. Considering resonant (oscillatory) body motion in each mode, this signal represents the amplitude of the sinusoidal velocity. The integrator 36 and modal velocity level generator 38 each receive HPR resonant frequencies as calibratable constant inputs.

The modal control generator 34 then receives heave, pitch, and roll signals from the washout filter block 32, from the integrator 36, and from the modal velocity level generator 38. The modal control generator 34 calculates a control signal for heave, pitch, and roll according to the following equation:

$$\text{control} = G_{vel} \cdot \frac{vel \cdot (1 + rf)}{\frac{|vel|}{vel\_level} + rf} \cdot e^{(G_{acc} \cdot sign(vel) \cdot acc)}$$

where:
control is the modal control signal for the respective heave, pitch or roll mode;
$G_{vel}$ is the modal velocity gain (tuning parameter);
vel is the modal velocity (from the integrator);
rf is a rounding factor (tuning parameter);
vel_level is the modal velocity level;
$G_{acc}$ is the modal acceleration gain (tuning parameter); and
acc is the modal acceleration.

The modal control generator 34 receives the rounding factor, velocity gains and acceleration gains as tuning parameters.

The deadband schedulor 40 receives deadband ratios and deadband sizes as tuning parameters. The deadband schedulor 40 contains three deadband schedules, one for each mode (heave, pitch and roll). Each deadband schedule is a three-piece linear function of its associated modal velocity level from the modal velocity level generator 38. The function is 0 for modal velocity levels at or below a certain point, and the function is 1 for modal velocity levels at or above a certain higher point. The function increases linearly from 0 to 1 between these two points. In fuzzy logic terminology, it is the membership function "velocity level high."

The multiplier 42 takes each modal control signal from the modal control generator 34 and multiplies it by its associated deadband schedule output from the deadband schedulor 40. In this manner, each modal control signal is adjusted in accordance with the significance of the ride event occurring.

The modal control signals then enter the front/rear splitter 44, which acts as a proportioner in that it takes each modal control signal and passes a certain proportion to the front adders 46,48 and the remainder to the rear adders 50,52. The adders 46 (front left), 48 (front right), 50 (rear left), 52 (rear right) either add or subtract, as appropriate for the corner, each proportioned modal control signal to yield a corner control signal corresponding with the particular continuously variable damper 20,22,24,26.

The four signals from the adders 46,48,50,52 then enter the damper/actuator linearization table 54. The damper/actuator linearization table 54 receives damper/actuator data as calibratable constants. The damper/actuator linearization table 54 receives the output signals from the adders 46,48, 50,52 and compensates for any non-linearities in the hydraulics or electromagnetics within the valve of the respective continuously variable damper. The resulting damper commands will then be passed to four closed loop current controllers (for solenoid valves) or stepper motor drivers, the outputs of which will adjust each respective continuously variable damper 20,22,24,26.

In this manner, the control algorithm 28 is used in conjunction with the vehicle suspension incorporating properly tuned continuously variable dampers 20,22,24,26 for improving the ride quality of the vehicle.

While the best mode for carrying out the invention has been described in detail, those familiar with the art to which this invention relates will recognize various alternative designs and embodiments for practicing the invention within the scope of the appended claims.

What is claimed is:

1. A method for controlling continuously variable dampers in a vehicle suspension system, comprising:
   receiving sensor signals from the vehicle;
   generating heave, pitch and roll acceleration signals, heave, pitch and roll actual velocity signals, and heave, pitch and roll velocity amplitude level signals based on the received sensor signals;
   calculating a heave control signal, a pitch control signal and a roll control signal based on the acceleration, actual velocity and velocity amplitude level signals; and
   adjusting the continuously variable dampers in accordance with the calculated heave, pitch and roll control signals.

2. The method of claim 1, wherein the step of receiving sensor signals comprises receiving signals from vertical accelerometers on the vehicle.

3. The method of claim 2, further comprising performing a matrix multiplication on the signals received from the vertical accelerometers to yield heave, pitch and roll acceleration signals, and filtering any low frequency components from the heave, pitch and roll acceleration signals.

4. The method of claim 3, wherein the step of generating heave, pitch and roll actual velocity signals comprises integrating the filtered heave, pitch and roll acceleration signals.

5. The method of claim 1, further comprising multiplying the calculated heave, pitch and roll control signals by a deadband schedule function indicative of the significance of the particular ride event.

6. A vehicle suspension system, comprising:
   a plurality of sensors connected to the vehicle;
   a plurality of continuously variable dampers connected to the vehicle; and
   a controller in electrical communication with the sensors and dampers, said controller being operative to:
   receive sensor signals from the sensors;
   generate heave, pitch and roll acceleration signals, heave, pitch and roll actual velocity signals, and heave, pitch and roll velocity amplitude level signals based on the received sensor signals;
   calculate a heave control signal, a pitch control signal and a roll control signal based on the acceleration, actual velocity and velocity amplitude level signals; and adjust the continuously variable dampers in accordance with the calculated heave, pitch and roll control signals.

7. The suspension system of claim 6, wherein the controller is further operative to multiply the calculated heave, pitch and roll control signals by a deadband schedule function indicative of the significance of the particular ride event.

8. The suspension system of claim 6, wherein said sensors comprise vertical accelerometers, and the controller is further operative to perform a matrix multiplication on the signals received from the vertical accelerometers to yield heave, pitch and roll acceleration signals, and to filter any low frequency components from the heave, pitch and roll acceleration signals.

9. The suspension system of claim 8, wherein the controller is further operative to integrate the filtered heave, pitch and roll acceleration signals to generate said actual velocity signals.

10. A method for controlling continuously variable dampers in a vehicle suspension system, comprising:

receiving sensor signals from the vehicle;

generating heave, pitch and roll acceleration signals, heave, pitch and roll actual velocity signals, and heave, pitch and roll velocity amplitude level signals based on the received sensor signals;

calculating a heave control signal, a pitch control signal and a roll control signal in accordance with the following formula:

$$\text{control} = G_{vel} \cdot \frac{vel \cdot (1 + rf)}{\frac{|vel|}{vel\_level} + rf} \cdot e^{(G_{acc} \cdot sign(vel) \cdot acc)}$$

where $G_{vel}$ is a velocity gain, vel is the actual velocity, rf is a rounding factor, vel_level is the velocity amplitude level, $G_{acc}$ is an acceleration gain, and acc is the acceleration for the respective heave, pitch or roll mode; and adjusting the continuously variable dampers in accordance with the calculated control signals.

* * * * *